March 21, 1967     D. C. BRUNTON     3,310,674
LOCAL AND AVERAGE FLUID DENSITY MEASURING SYSTEM
Filed Oct. 20, 1961
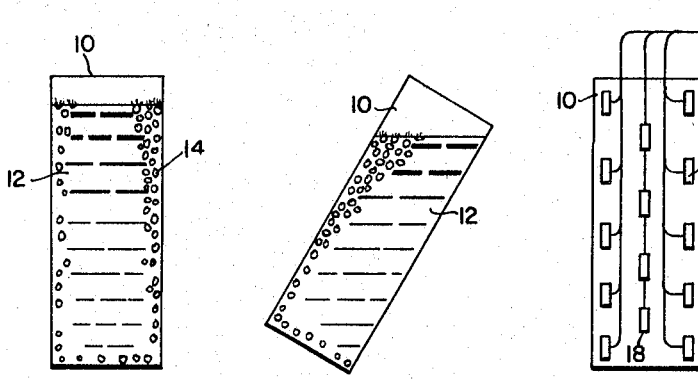
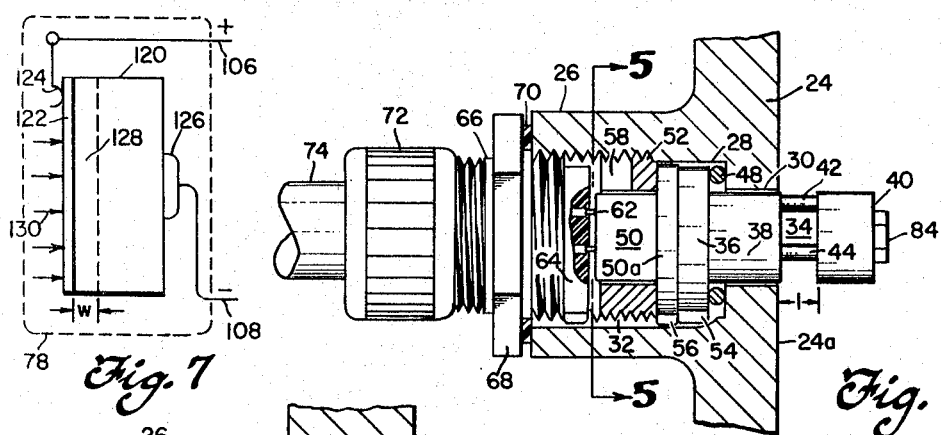
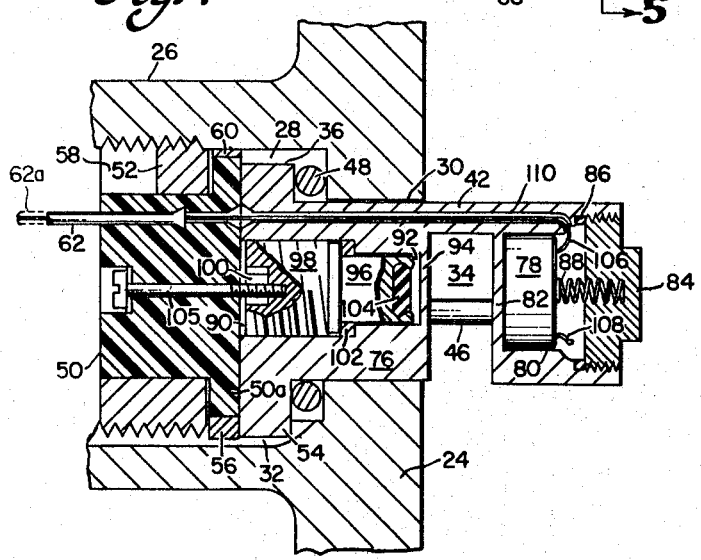
INVENTOR
Donald C. Brunton
by Anthony D. Cennamo
Attorney

United States Patent Office 3,310,674
Patented Mar. 21, 1967

1

3,310,674
LOCAL AND AVERAGE FLUID DENSITY MEASURING SYSTEM
Donald C. Brunton, Columbus, Ohio, assignor to Industrial Nucleonics Corporation, a corporation of Ohio
Filed Oct. 20, 1961, Ser. No. 146,643
3 Claims. (Cl. 250—43.5)

This invention relates to a system employing penetrative radiation for measuring the quantity of liquid in tanks; in one more specific aspect it relates to the measurement of tank contents having density characteristics which are subject to unpredictable variations from one location to another within the tank, and in another aspect it relates to small, light-weight but efficient radiation density probes adapted for submergence in cryogenic liquids.

In circumstances where it is not possible or practicable to directly weigh the contents of a tank, the mass of a variable-density liquid therein can be computed from the product of the fill level and density, which are measurable by suitable radiation instruments. The problem becomes complicated, however, where the density of the liquid varies locally from place to place within the volume thereof. This situation often obtains, for example, in the case of ordinarily gaseous materials which are liquefied at low temperature and under moderate pressures. Here the density variations are caused by "boiling," that is, the formation of gas bubbles within the liquid, not only at the surface but along the bottom and sides of the tank where the tank parts undergo heat exchange with the external environment. The extent of the boiling as well as the localized areas wherein it occurs are subject to change with ambient temperature, wind direction and velocity, the direction of the sun's rays incident on the tank, or pressure variations caused by changes in the level of the tank's contents or changes in the direction and magnitude of gravity or other accelerating forces on a tank mounted in a vehicle such as a space vehicle.

In accordance with this invention, the average density of the liquid in the tank is indicated by proper summation of the outputs of a plurality of radiation density probes located at a plurality of strategic points throughout the volume of the tank. The average density indication, in combination with a proper fill level indication such as that provided by the apparatus described in the copending application of Philip T. Martin, Ser. No. 113,008, filed May 26, 1961, and which issued as U.S. Patent No. 3,170,064, may then be utilized by a suitable analog computer to provide an accurate indication of the mass of the liquid in the tank.

An application such as that described, for example, the measurement of liquid oxygen, is found to require a density probe having special characteristics. Hence in order to obtain a truly localized density indication from the probe, and to essentially eliminate shielding problems, a preferred probe apparatus in accordance with the invention employs a source of beta rays having a short range of penetration in the liquid, and the probe is inserted directly therein.

Under these conditions conventional gas-filled radiation detectors are inoperative since the gases used therein will "freeze out" and liquefy or solidify when exposed to the cryogenic liquid. Hence, further in accordance with the invention there is provided a novel density probe employing a solid-state detector as hereinafter described, preferably of the kind which is termed a solid-state ionization chamber. A number of devices of this type which have been proposed are quite impractical radiation detectors at ordinary temperatures, and hence for many years they have been the subject of only academic interest.

2

However, at the temperatures of the liquefied gases, many of these devices will perform quite satisfactorily, and by their use the present invention provides an extremely compact, light-weight and highly efficient density probe.

Accordingly, it is an object of this invention to provide a system for accurately measuring the quantity of liquid in a tank having contents whose density varies locally in an unpredictable manner from place to place within the volume thereof.

It is another object to provide a measuring system in accordance with the foregoing object which is adapted to the measurement of cryogenic liquids.

It is still another object to provide a radiation density probe of extremely small size, light weight and high efficiency which is adapted for direct immersion in a cryogenic liquid.

It is yet another object to provide a density probe in accordance with the foregoing object which is adapted for use in an ensemble of other such probes in combination with a greatly simplified and reliable computer system for indicating the average density of the liquid in a tank whose contents are subject to density variations in spaced portions thereof.

Other objects and advantages of the present invention will become apparent in the following detailed description, taken in conjunction with the appended drawings, in which:

FIG. 1 is a sketch of a tank and its liquid contents, illustrating one situation wherein said contents can have a varying density in different portions of the volume thereof.

FIG. 2 is a sketch similar to FIG. 1, illustrating the effect of changed influences on the tank of FIG. 1 and its contents.

FIG. 3 is a sketch showing a multiple density probe arrangement in accordance with the invention for indicating the average density of the contents of the tank of FIG. 1.

FIG. 4 is a cutaway section of a tank wall, showing the manner in which one form of density probe in accordance with the invention may be mounted in the tank.

FIG. 5 is a section on the line 5—5 of FIG. 4.

FIG. 6 is a section on the line 6—6 of FIG. 5, showing details of the structure of the density probe.

FIG. 7 is a schematic showing of one form of a solid-state detector adapted for use in the density probe of FIG. 6.

Referring to FIG. 1, there is depicted a tank 10 containing liquid oxygen 12. "Boiling" conditions within the tank are indicated by the representation of bubbles as at 14. The amount, that is, the mass, of oxygen contained in the tank can be computed from the product of the volume and the density of the oxygen. However, the density figure to be considered is not strictly the density of the purely liquid oxygen per se, even though this varies slightly with temperature changes, but the so-called "bulk density," that is, the weight per unit volume of the mixture of oxygen bubbles and liquid. Hence, when the term "density" is used hereinafter with reference to cryogenic liquids, it will be understood to mean the bulk density.

As appears from FIG. 1, it is seen that a more vigorous boiling condition obtains on the right side of the tank. This condition may be due, as aforesaid, to the incidence of sunshine and/or a warming wind on the right side. It is seen also that the extent of the boiling varies with the height of volume portions within the tank as a result of associated pressure variations. A tank of the type described may be sixty feet high or more, and in a full tank at rest the pressure may vary from about one hundred p.s.i. at the bottom to seventy-five p.s.i. near the surface due to the weight of the liquid under gravity forces alone. Obviously a much greater range of variation will occur under dynamic conditions as in a space vehicle.

As shown in FIG. 2, at a different time and as a result changes in the magnitude and direction of temperature and pressure influences, marked changes have taken place in the extent and location of boiling regions within the tank. Thus it becomes apparent that in order to obtain an accurate indication of the average density of the tank's contents, a plurality of measurements are required at different locations within the volume thereof.

Referring to FIG. 3, in accordance with this invention a plurality of radiation density probes as at 16 and 18 are installed in the tank at strategic locations where representative density measurements can be obtained. The probes are electrically connected to suitable summation computer circuitry 20 wherein the signals from the various probes are comibned. The output of the computor, representing the average density, is fed to a suitable indicating or recording instrument 22.

Obviously the mechanics of the probe mounting arrangement will depend on the type of installation, and various journeyman-like modifications of the probe design set forth herein may be made to suit particular requirements. The specific embodiment of the invention illustrated herein employs a probe design adapted for use with a specially constructed tank which permits the probes to be inserted through the tank walls, and whereby all installation and wiring may be done exteriorly of the tank.

Referring to FIGS. 4–6, the tank wall 24, which is generally made of aluminum or other light metal or alloy, is cast with bosses as at 26 having a central bore 28 terminating in a reduced-diameter stepped portion 30 extending through the inner tank wall surface 24a. The bore 28 has a milled key slot 32 at one end of a major diameter, and the outer end of the bore is internally threaded. This arrangement is adapted to receive the radiation source and detector assembly 34 of the probe. In FIG. 4 it is seen that this assembly generally comprises a mounting flange 36, a source housing 38, a detector housing 40, and three parallel, peripherally equidistant legs 42, 44 and 46 forming an open tripod support whereby the detector housing is spaced from the source housing to define a normally fluid-filled gap, having length 1, when the tank is in use.

The source housing portion 38 is inserted through the minor bore 30 communicating with the interior of the tank, and the opening is sealed by a metal gasket 48 between the mounting flange 36 and the stepped portion of the bore. A flanged, molded Teflon resin connector bushing 50 bears against the rear side of the source housing and the whole is secured in place by a cylindrical, externally threaded nut 52 which slips over the bushing 50 and faces against an integral flange 50a thereof. The source housing flange 36 and the bushing flange 50a bear respective indexing lugs 54 and 56 which are accommodated by the key slot 32 to secure the flanges against rotation in the bore 28 when the nut 52 is tightened by means of a conventional wrench (not illustrated) having lugs insertable into matching slots as at 58 extending into the rear peripheral face of the nut. As appears in FIG. 6, the bushing indexing lug 56 is an extension of a metal constraining band 60 around the periphery of the bushing flange 50a to prevent the same from expanding diametrically into the threads of the bore 28 and seizing therein when the flange is laterally compressed.

Connector bushing 50 carries a pair of molded-in male connector prongs as at 62 which mate with matching female prongs in a second, flanged, index-lugged, molded Teflon resin bushing 64 loosely inserted into a metal nipple-fitting 66 which carries an integral, faced nut 68 whereby the nipple-fitting is screwed into the threaded bore 28 of boss 26 which is faced for sealing engagement with a suitable gasket 70 between the nut 68 and the boss.

The outer end of fitting 66 forms one member of a conventionally arranged, waterproof connector 72 for a coaxial lead 74 connecting the density probe to external circuitry.

Referring in particular to FIG. 6, the source and detector housing comprises a miniature casting 76 including (see FIG. 5) the source housing 38, the mounting flange 36, the detector housing 40 and tripod support members 42–46 therefor. The detector elements are contained in a sealed capsule 78 which sits in a minor bore 80 terminated at the left end by a thin window 82 which is an integral part of the casting 76 and readily penetrable by beta rays. The detector housing is closed at the right end by a pipe-threaded plug 84 which screws into matching threads in the housing and sealingly engages a peripheral metal gasket 86 seated on a stepped shoulder in the major bore of the housing. The detector capsule 78 is secured against movement in the housing by the pressure of a coil spring 88 having a well-seat in the center of the plug 84.

The radiation source assembly is installed in a stepped bore 90 which is open, enlarged and internally threaded in the left end of casting 76. The minor bore 92 is terminated at the right end by a thin, integrally-cast and beta ray-penetrable window 94. The radiation source holder comprises a solid metal slug having a rod-like end-portion 96 of reduced diameter extending into the minor bore 92, and a larger-diameter, externally threaded end-portion 98 which screws into the major bore 90. When the slug is screwed home, utilizing an Allen wrench socket 100 provided in the head of the slug, a metal gasket 102 is compressed between the stepped portion of the slug and the matching portion in the bore of the casting.

The rod portion 96 of the source slug has a counter-bore and a rolled end forming a cup containing the fused binder 104 for a radioactive beta emitter material which is located adjacent to the window 94 in the casting 76 when the slug is in place. As is known, a further thin, stainless steel diaphragm may be placed over the exposed end of the active material 104 and silver soldered to the rolled edge of the slug. However, with the use of high-integrity materials now available as the binder 104, this expedient is not generally considered necessary from the radio-logical safety aspect.

For convenience of assembly and to facilitate any replacement which might possibly become necessary, the source and detector unit is provided in an assembly which includes the connector bushing 50 provisionally secured to the source and detector unit by a screw 105 passing through the bushing 50 and threaded into the source slug 98. It is apparent that a similar screw having an extension beyond the head thereof can be used as a puller to withdraw the assembly from the tank bore. It the installation of the detector capsule 78, the insulated leads 106 and 108 thereof are drawn through drilled passages as it 110 passing axially through the tripod support legs 42 and 44 and aligning with similar passages in bushing 50 which communicate with the hollow male connector pins as at 62. The stripped ends of the wire leads are then dip-soldered in the ends as at 62a of the pins.

Referring to FIG. 7, the thin-walled detector capsule 78, shown here in dotted lines, preferably contains a thin wafer 120 of p-type silicon or germanium having a donor material such as phosphorous diffused into one surface thereof to form an n-type region 122. This device forms a rectifying junction diode to which a reverse bias voltage is applied via leads 106 and 108 and contacts 124 and 136. The bias voltage appears across the so-called depletion layer, which is a region on either side of the junction as represented by the layer 128 having the width $w$. Beta particles incident on the detector in the direction of the arrows as at 130, as well as the concomitant delta particles, effect a high linear energy transfer to the solid material of the wafer along the tracks of the particles. This energy transfer generates charge carriers within the semiconductor; those carriers appearing in the depletion layer where a high-intensity electric field obtains are swept apart in a manner similar to that of the gas ions generated in a conventional ionization chamber, and a current flows in the external circuit in proportion to the total charge transported by the carriers, which in turn is a function of the intensity of the radiation incident on the detector.

A suitable circuit is provided for each of the probes, FIG. 3, and a plurality of such circuits is understood to be incorporated in box 20. Such circuits are designed in accordance with known principles whereby the detector currents are converted to respective density indications by either pulse circuit techniques or current integrating techniques.

While the invention has been shown and described as embodied in specific apparatus, such showing and description is meant to be illustrative only and not restrictive, since obviously many changes, modifications and outwardly different embodiments can readily be made without departing from the spirit and scope of the invention as is set forth in the appended claims.

What is claimed is:

1. In a tank containing a cryogenic fluid subject to density variations from one location to another within the volume thereof, a plurality of density probes immersed in said fluid with one probe at each of said locations, each probe comprising a source of beta radiation, a solid-state radiation detector, and means for mounting said detector within the volume of said fluid and substantially surrounded thereby, said mounting means including means for maintaining a spacing between said detector and said source which is within the penetration range in said fluid of beta radiation from said source whereby said detector is adapted to provide an output signal indicative of the local density of said fluid at a respective location, summing circuit means for combining said output signals from said plurality of detectors to produce an aggregate signal indicative of the average value of said local density indications and means utilizing said aggregate signal for indicating the average density of said fluid in said tank.

2. An apparatus as in claim 1 wherein each of said detectors comprises a body of solid material having a pair of contiguous layers of different conductivity types forming a diode, means for applying a bias voltage across said diode and means responsive to current flow therethrough as a result of bombardment by said beta radiation penetrating said fluid.

3. In a tank containing a fluid material subject to density variations from one location to another within the volume thereof, a plurality of density probes immersed in said fluid with one probe at each of said locations, each probe comprising a beta radiation source and a radiation detector spaced from each other a distance within the penetration range of beta radiation from said source whereby said detector is adapted to provide an output signal indicative of the local density of said fluid at a respective location, summing circuit means for combining said output signals to produce an aggregate signal indicative of the average value of said local density indications and means utilizing said aggregate signal for indicating the average density of said fluid in said tank.

References Cited by the Examiner

UNITED STATES PATENTS

| 2,487,797 | 11/1949 | Friedman | 250—83.6 |
| 2,747,104 | 5/1956 | Jacobs | 250—83.3 |
| 2,830,183 | 4/1958 | Wolfe | 250—43.5 |
| 2,922,884 | 1/1960 | Fearnside | 250—83.4 |
| 2,933,601 | 4/1960 | Friedman | 250—43.5 |
| 2,952,774 | 9/1960 | Howard | 250—43.5 |
| 2,978,581 | 4/1961 | Wehrli | 250—43.5 |
| 2,991,366 | 7/1961 | Salzberg | 250—83.3 |

RALPH G. NILSON, *Primary Examiner.*

JAMES W. LAWRENCE, *Examiner.*

A. R. BORCHELT, *Assistant Examiner.*